United States Patent [19]

McKeever

[11] 4,077,118

[45] Mar. 7, 1978

[54] METHOD AND APPARATUS FOR MAKING LENGTHS OF FLEXIBLE MATERIAL

[75] Inventor: Carl W. McKeever, Kendallville, Ind.

[73] Assignee: Lyall Electric, Inc., Albion, Ind.

[21] Appl. No.: 713,363

[22] Filed: Aug. 11, 1976

Related U.S. Application Data

[60] Continuation-in-part of Ser. No. 608,097, Aug. 27, 1975, Pat. No. 3,996,826, which is a division of Ser. No. 493,273, July 31, 1974, abandoned.

[51] Int. Cl.[2] .............................................. B23P 19/04

[52] U.S. Cl. ....................................... 29/748; 29/753; 29/749; 29/628; 29/630 A

[58] Field of Search ..................... 29/628, 629, 630 R, 29/630 A, 203 R, 203 D, 203 DS, 203 DT, 747, 748, 749, 753; 81/9.51, 9.5 R; 83/202, 176, 580

[56] References Cited

U.S. PATENT DOCUMENTS

| | | | |
|---|---|---|---|
| 1,288,402 | 12/1918 | Gale | 83/157 |
| 3,231,961 | 2/1966 | Andren et al. | 29/203 DS |
| 3,283,398 | 11/1966 | Andren | 29/203 DS |
| 3,505,720 | 4/1970 | Heimbrock | 29/203 DT |
| 3,653,412 | 4/1972 | Gudmestad | 81/9.51 |
| 3,795,962 | 3/1974 | Baldyga | 29/203 D |

*Primary Examiner*—C.W. Lanham
*Assistant Examiner*—Daniel C. Crane

[57] ABSTRACT

A method and apparatus for processing elongated lengths of material from a supply thereof, such as insulated wire mounted on spools or reels, into lengths, such as into electrical leads of predetermined lengths. The wire is drawn off continuously from the reel and is fed intermittently into the apparatus wherein it is cut off to lengths and gripped in the apparatus with the ends of the cut-off lengths a fixed distance apart and exposed. When the wire is thus cut off and gripped, it is moved at right angles to the length thereof along the apparatus while work operations are performed on at least one end of the lead, the work operations consisting of stripping insulation from the end of the lead and applying a terminal thereto. When the leads have been completely processed, the apparatus straightens the leads out in the direction of the length thereof and delivers them to a receiving station, and wherein the leads are counted and removed from the receiving station in batches of a predetermined number. The apparatus is readily adjustable to accommodate wires of different size and to make leads of varying lengths.

15 Claims, 14 Drawing Figures

METHOD AND APPARATUS FOR MAKING LENGTHS OF FLEXIBLE MATERIAL

This is a continuation-in-part of Ser. No. 608,097, filed Aug. 27, 1975, now Pat. No. 3,996,826, which in turn is a division of Ser. No. 493,273, filed July 31, 1974, now abandoned.

The present invention relates to a method and apparatus for processing lengths of material, such as insulated electrical wire, and particularly relates to such a method and apparatus for converting continuous lengths of the material, such as insulated electrical wire mounted on a reel, into readily usable form, such as electrical leads.

Electrical leads for making connections between terminal points in equipment are, of course well known and are widely used. Ordinarily, the wiring in such a piece of equipment, in the form of leads, is applied in an assembly operation and it is desirable for the wire leads to be put in place quickly and with as little labor, especially skilled labor, as possible. For the foregoing reason, it is desirable for the wire leads to be made up prior to assembly by being cut to the proper length and provided with a terminal on at least one end thereof so that the individual installing the wire leads in the equipment can do so in the minimum amount of time and with the exercise of minimum skill. It is also of benefit to be able to process the wire into leads quickly and inexpensively.

The present invention is particularly concerned with a method and apparatus for withdrawing substantially continuous lengths of insulated electrical wire from a reel or like source, cutting the wire to a predetermined length and then stripping insulation from one or both end portions thereof and applying a terminal to at least one of the stripped end portions.

A primary object of the present invention is the provision of a method and apparatus as described above which will operate rapidly and efficiently.

Another object of the present invention is the provision of a method and apparatus of the nature referred to which is extremely flexible in that it can handle wire of different sizes and can make leads of a wide range of lengths from relatively short leads up to relatively long leads.

A still further object of the present invention is the provision of a method and apparatus for converting reel mounted electrical wire into wire leads of a selected length with a terminal on at least one end in which the formed leads are delivered in groups, or batches, of a predetermined number each for ease of bundling the leads for storage and for movement to a point of use.

A still further object of the present invention is the provision of a method and apparatus of the aforesaid nature in which the completed leads emerge from the machine in straightened out groups, or batches, or a predetermined number each.

Another object of the present invention is the provision of an apparatus of the nature referred to which is readily adjustable to accommodate the machine to various work operation combinations without physical adjustment of machine parts.

Still another object of the present invention is the provision of an apparatus of the nature referred to in which the apparatus can be prepared for one type of work cycle while carrying out another, thereby substantially reducing changeover time.

Other objects and advantages of the invention will appear more fully hereinafter and for purposes of illustration, and not of limitation, embodiments of the present invention are shown in the accompanying drawings in which.

Figures 1, 2, 3, 4, 5, 6:
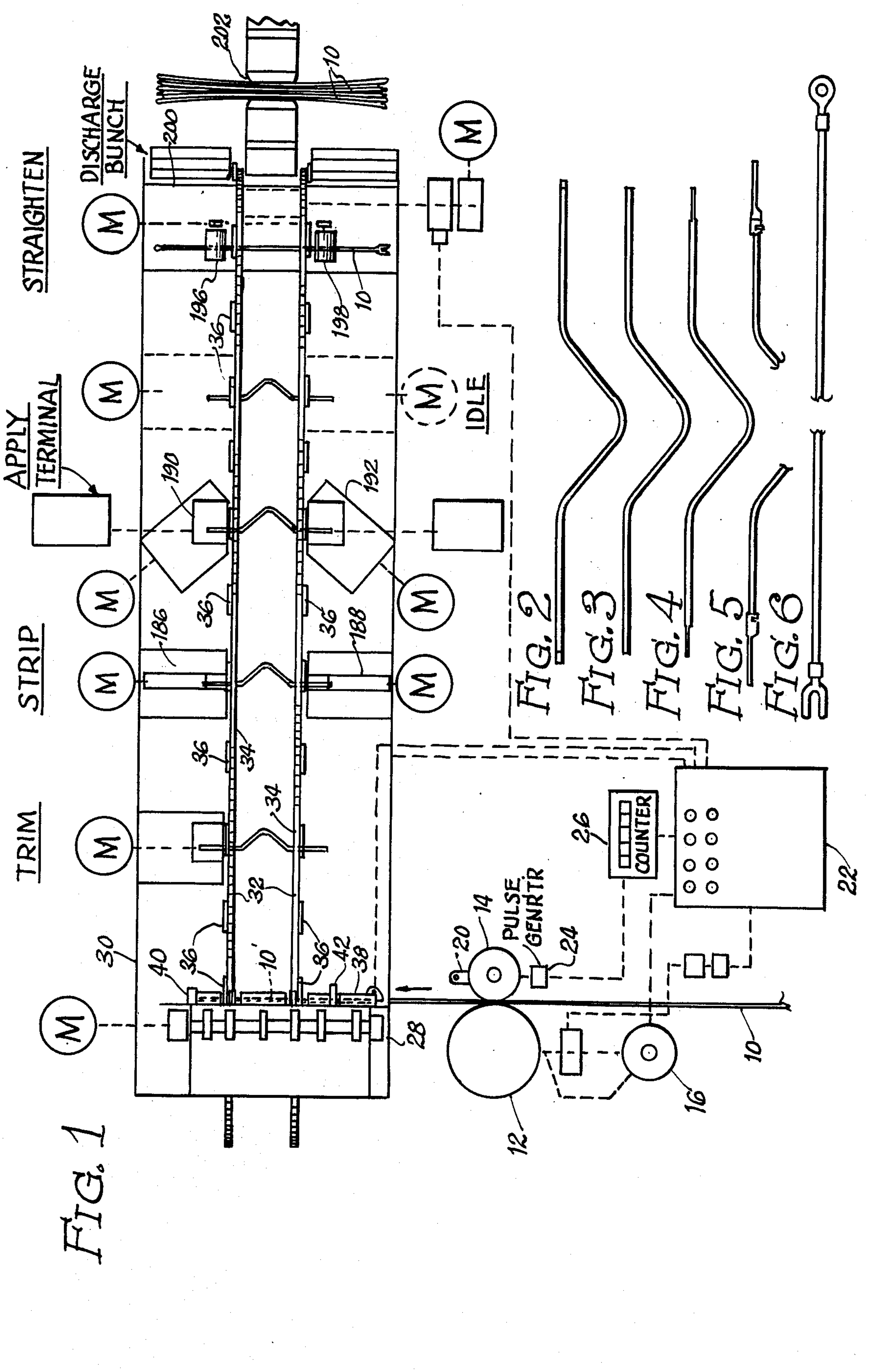
FIG. 1 is a schematic plan view of an apparatus embodying the features of the present invention illustrating the various stations forming the apparatus when work operations are conducted.
FIGS. 2 through 6 are views illustrating the electrical wire being processed in accordance with the present invention at various stages.

The concepts of the present invention reside in a method and apparatus for use in the processing of continuous material such as wire or the like in which the continuous material is, in rapid and automatic sequence, reduced to segments having the desired length and subsequently subjected to the desired processing steps, including, without limitation, removal of insulation on wire material, fixation of a desired terminal, convergence to an accumulation zone, etc. The method and apparatus of the invention are particularly well suited for use in the manufacture of relatively short leads formed of electrical conductors having terminals fixed on one or both ends.

According to the present invention, electrical wire is continuously withdrawn from a reel thereof, or other suitable source, to a feed station and from the feed station is fed intermittently in the direction of the length of the wire into an apparatus for treating the wire. The wire is fed into the apparatus transverse to the length of the apparatus and is cut off to length in the apparatus.

The length of wire fed into the apparatus is measured on the apparatus side of the feed station and the feeding of the wire is interrupted when a predetermined measured length thereof has been fed from the feed station toward the apparatus. When the feeding of the wire is interrupted, it is cut off at the side of the apparatus nearest the feed station.

The wire fed into the apparatus from the feed station is guided in a channel, or trough, in the apparatus to an abutment located in the apparatus at the outboard side thereof opposite the side on which the feed station is located (the inboard side). Within the apparatus is a pair of grippers, aligned with the aforementioned trough which are open during wire feed and through which the feed in wire passes during the feeding operation. The grippers are mounted on conveying means which move the grippers step by step along the length of the apparatus. During the feeding of the wire, any length of wire fed in which is greater than the distance between the point of cutting the wire off and the abutment falls in a slack loop, or balloons, between the aforementioned grippers. The trough in which the wire is guided as it is fed into the apparatus has a central section between the grippers which is closed until the leading end of the wire is about at the abutment and which then opens to permit the wire to balloon out between the grippers. This section of the trough is preferably curved so the wire will readily balloon out without hesitation when the leading end of the wire engages the abutment.

The apparatus is operable for closing the gripper nearest the abutment on the wire when the wire reaches the abutment and at just about the same time the central section of the trough is opened. Thereafter, when the desired length of wire has been fed into the apparatus, the gripper nearest the feed station is closed on the wire and the infeed of wire into the apparatus is halted and immediately thereafter the wire is cut off between the feed station and the gripper nearest thereto. The cutoff wire, which now forms a lead, has a certain length exposed to the outside of each gripper for the performance of work operations thereon. These lead ends, regardless of the length of the lead, within the range of the apparatus, are always the same distance apart.

The cut off lead, now gripped near the ends, is then indexed in parallelism with itself and at right angles to the length thereof to a new position in the apparatus thereby clearing the space in the apparatus where the wire is fed so a further length of wire can immediately be fed into the apparatus.

The cut off and gripped leads move step by step along the length of the apparatus with the ends of the leads exposed. In successive stations, arranged along the apparatus adjacent the path taken by the leads, a predetermined amount of the insulation is stripped off from at least one end of the leads and a terminal is applied to at least the said one end of the lead.

In a still further station, the gripping of the lead near the ends thereof is released and the ends of the lead are engaged by rollers and are driven laterally outwardly at the respective sides of the apparatus so that any slack loop in the lead between the gripped points is eliminated and the leads are pulled out so as to be substantially straight. When thus straightened out, so as to be relatively taut between the keepers, the straightening rollers are released from the lead and the grippers are again closed on the lead. On the next step of the conveying means, the leads are advanced to a discharged station.

At the end of the machine opposite the cam head assembly, and following the straightening station, the center of the lead is carried over and in contact with an accumulator bar which is locked midway between the parallel with the chain rails, the top edge of the accumulator bar being in the same horizontal plane as that of the wire lead held between the grippers. The accumulator bar extends horizontally well beyond the chain conveyor and serves as the accumulator and unloader for the finished leads.

As the conveyor is indexed, the center of the lead is carried farther astride the accumulator bar by the grippers. In a subsequent step or index of the conveyor, the lead is carried farther astride the accumulator bar and is drawn under to adjacent parallel folding rods whereby the lead is folded over the accumulator bar for discharge from the apparatus. The details of the discharge means are described more fully in copending application Ser. No. 493,274, entitled "Conveyor System For Lengths of Flexible Material," filed July 31, 1974, the disclosure of which is incorporated herein by reference.

Having described the basic concepts of the invention, reference is now made to the accompanying drawings for a more detailed disclosure of the invention.

As shown in FIG. 1, the apparatus includes a pair of feed drive rollers 12 and 14 between which a wire 10, such as an insulated electrical conductor, is passed from a suitable source of the electrical conductor, such as a reel or the like supply (not illustrated in the drawings for purposes of simplicity).

One of the feed drive rollers 12 and 14 is powered by a motor 16 which serves to drive the feed drive roller 12 through clutch means operatively connecting the motor 16 with the feed drive roller 12. As will be appreciated by those skilled in the art, it is possible to employ a direct drive between the motor 16 and the feed drive roller 12; however, it is frequently preferable to employ clutch means 18 so that the motor 16 can be energized continuously when the apparatus is in operation to thereby avoid or minimize inertial and/or mechanical time lags which would otherwise occur if the motor 16 were started intermittently to feed wire to the apparatus.

Figure 10:
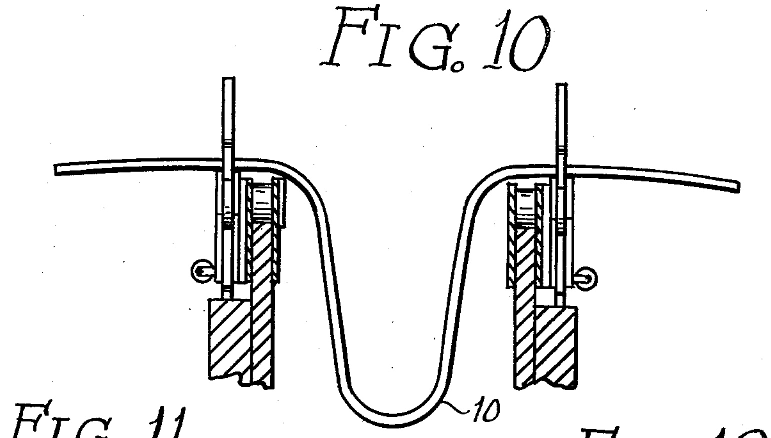
FIG. 10 is a sectional view taken along the lines 10—10 of FIG. 9.

The roller 14 has a predetermined size and serves to maintain the wire 10 in a gripping relation between rollers 12 and 14 whereby roller 12, when driven by motor 16, serves to feed the wire 10 to the apparatus in the direction shown by the arrow in FIG. 10.

It is frequently desirable that roller 12 be mounted on a pivotal arm 20 to facilitate threading the wire 10 between rollers 12 and 14. As indicated, roller 14 is of a predetermined size and consequently serves to measure the linear length of the wire fed to the apparatus. Thus, each complete revolution of the roller 14 is a measure of a linear distance of the wire advanced between rollers 12 and 14. The measurement of the wire advanced between rollers 12 and 14 may be based on a given increment of length and, thus, roller 14 may have a circumference equal to any desired number of increments of length, such as a circumference corresponding to 100 units of length.

Roller 14 is operatively connected to a control panel generally designated as 22 through a pulse generator 24 and a counter 26. In this way, each increment of length assigned to the roller 14 may be translated by the pulse generator to an electrical pulse. The pulses thus generated by the pulse generator and counter mechanism employed in the practice of this invention are generally conventional and form no part of the present invention. Any of a variety of known counter arrangements may be employed, such as photoelectric means to generate pulses which pulses are then counted in a conventional electronic counting device.

Similarly, the control panel 22 is operatively connected to the clutch means 18 to activate the clutch means at the appropriate stage to advance the wire 10 between the rollers 12 and 14, and to deactivate the clutch means 18 when the desired linear length of wire 10 has been advanced between the rollers 12 and 14.

The wire 10 advanced between the feed rollers 12 and 14 is supplied to a cam head generally indicated as 28 in FIG. 1. The cam head assembly 28 is mounted on a frame 30 of the apparatus. Also mounted on the frame 30 is a pair of spaced parallel rails generally designated as 32 in FIG. 1, upon which are mounted a pair of laterally spaced conveyor chains 34. The conveyor chains 34 are provided with opposed pairs of grippers 36 which are spaced equidistantly over the length of the endless chains 34.

The wire 10 advanced to the cam head assembly 28 is guided into a channel or trough 38 formed in the cam head assembly. The wire 10 is advanced into the channel 38 such that the leading end of the wire engages an outward abutment generally designated as 40 in FIG. 1. As is shown in this figure, the abutment 40 is on the side of the trough 38 opposite the feed rollers 12 and 14.

Adjacent to the opposite end of the trough 38, there is provided cutting means 42, including a blade or knife which operates, when activated, to cut off the wire after the desired linear length of the wire has been advanced between the feed rollers 12 and 14.

Figure 8:
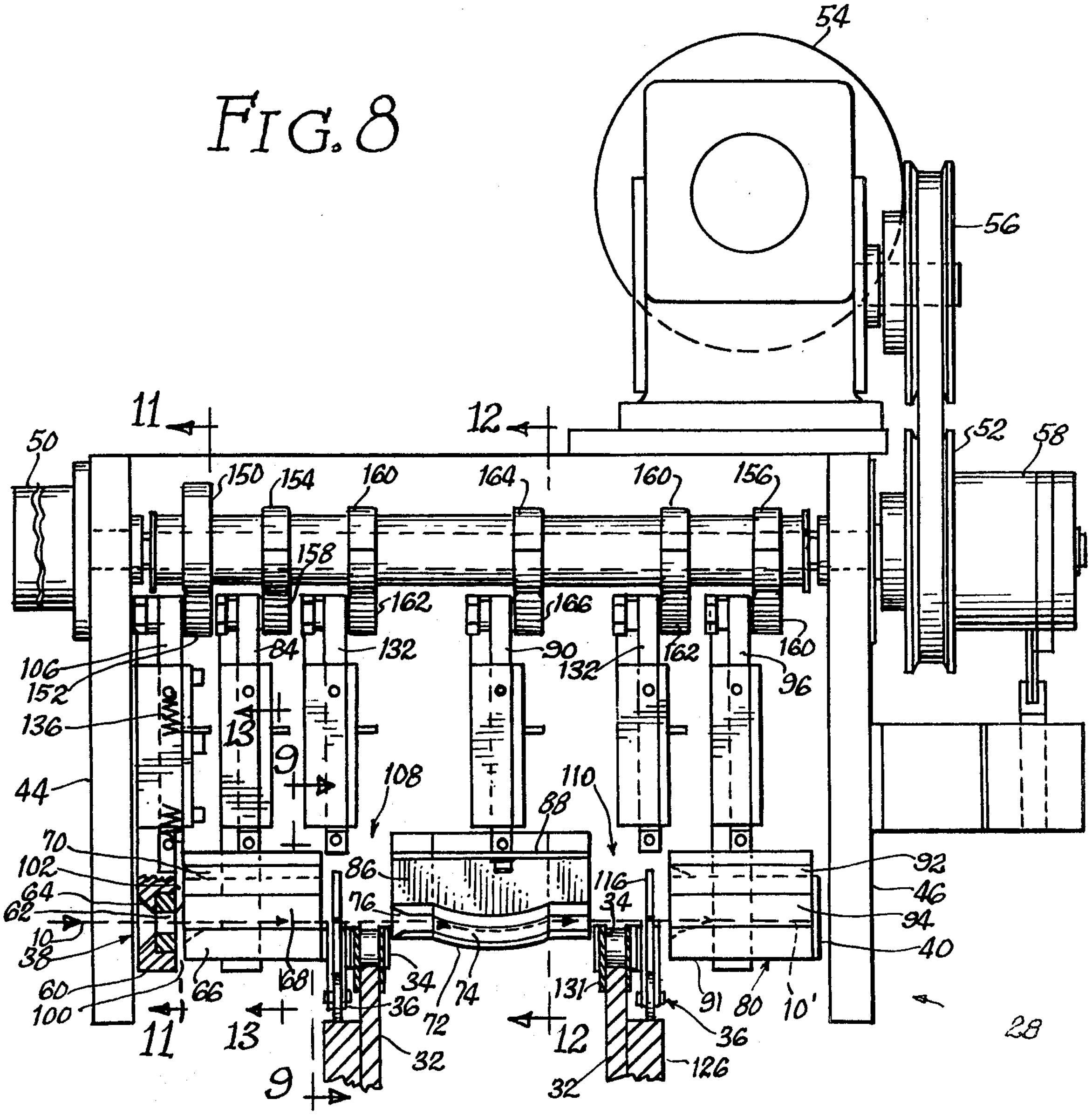
FIG. 8 is a view in elevation of the cam head assembly of the present invention.

The details of the cam head assembly 28 are shown in FIG. 8 of the drawing. As will be seen from this figure, the cam head assembly 28 includes a pair of spaced, opposing side panels 44 and 46 which generally define a rigid frame for the cam head assembly. Journaled in the upper portions of said panels 44 and 66 is a cam shaft 48 having a backstop clutch 50 mounted on one end thereof, and means to drive the cam shaft 48 and the backstop clutch 50 adjacent the other end thereof. As will be appreciated by those skilled in the art, various means can be employed to drive the cam shaft. It is generally preferred to rotate the cam shaft 48 in increments of 180°.

In the preferred practice of the invention, the apparatus includes a motor 54 provided with a belt and pulley arrangement 56 to drive a pulley 52. The drive means illustrated also includes a single revolution clutch 58 which is driven by motor 54 by the pulley arrangement 56 and pulley 52. By the use of a position clutch, the cam shaft 48 can be caused to rotate 180° each time the clutch is activated.

As is also shown in FIG. 8 of the drawing, the channel generally referred to as 38 through which the wire 10 is advanced by the drive rollers 12 and 14 extends in a direction generally parallel to that of the cam shaft 48. The channel or trough 38 is defined by a series of channel members which are illustrated in FIG. 8. As is shown, the channel 38 is defined by a series of channel members 66 which can be referred to as the inboard trough or channel member, a central channel member 72 and an outboard channel member 80. The outboard channel member 80 adjacent to the outboard side panel 46 is fixed with the abutment 40 which serves to stop the leading end of the wire supplied to the channel 38.

As shown in FIG. 8, the first channel member 66 has a tapered entrance opening 64 through which the wire 10 is fed through a guide member 60 having a central opening 62 extending therethrough and the tapered entrance opening 64.

The inboard channel member 66 includes a central opening 68 extending therethrough which is open on one side. A reciprocating door 70 is provided to close the central opening 68.

The central channel member 72 which in part defines the trough 38 includes a central opening 74 and a tapered entrance opening 76 communicating with the central opening 74. In the preferred embodiment of this invention, the central opening of the central channel member 72 is curved downwardly as shown in FIG. 8 to permit the wire 10 to bloom outwardly from the opening 74 extending therethrough without hesitation when the end of the wire 10 engages the abutment 40. The opening 74 extending through the central channel member 72 is open on one side and is adapted to be closed by doors reciprocating between channel closing and channel opening positions.

Figure 13:
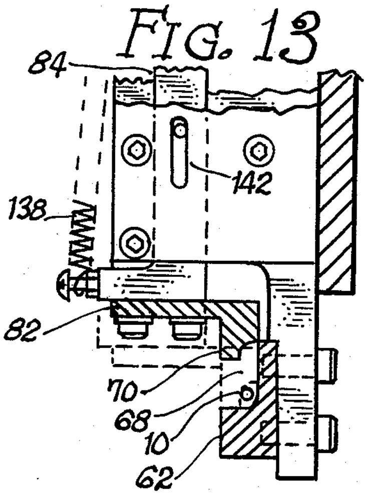
FIG. 13 is a sectional view taken along the lines 13—13 in FIG. 8.

The details as to the configuration of the inboard channel member 62 are best shown in FIG. 13 of the drawing. As can be seen in this figure, the channel member 62 has a generally L-shaped configuration and thus serves to define the central opening 68. The door of the inboard channel member is shown as 70 in FIG. 13 and has a corresponding, generally L-shaped configuration whereby channel member 62 and the door 70 serve to define the central opening 68. As is shown in FIG. 13, the door 70 includes a flange 82 fixed to a reciprocating rod 84 to enable the door 70 to be raised to the open position and lowered to the closed position.

Figure 12:
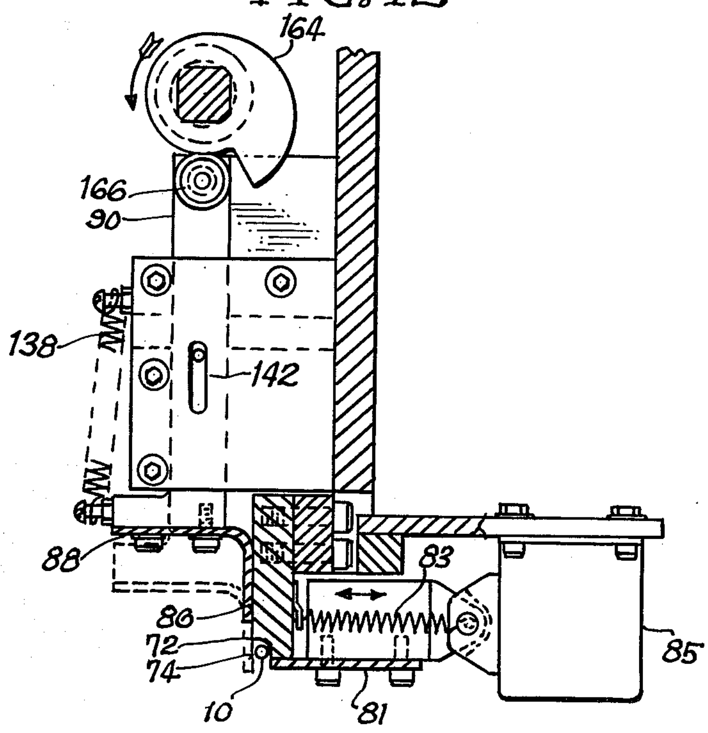
FIG. 12 is a sectional view taken along the lines 12—12 in FIG. 8.

Similarly, the doors closing the central opening 74 of the central channel member 72 are shown in greater detail in FIG. 12 of the drawing. As can be seen in this figure, the central channel member 72 is formed with a recess open on two sides to define the central opening 74 to receive the wire 10. The central channel member is closed by a pair of doors, one being a generally horizontally reciprocating door designated as 81 in FIG. 12 and the other being a generally vertically moving door 86 in FIG. 12. Thus, the bottom or lower portion of the central opening 74 and channel member 72 is closed by door 81 which is urged to the closed position by spring 83 and is opened by a solenoid 85. The forward portion of the central opening 74 is closed by reciprocating the door 86 in a downward direction as shown in FIG. 12. For this purpose, the door 86 includes a flange member 88 which in turn is fixed to a reciprocating bar 90 to move the door 86 toward the closed position.

The outboard channel member 91 is similar to the inboard channel member 66 and includes a door 92 for the purpose of closing the central opening 94 defined by the channel member 91. The door 92 is closed by means of a reciprocating push rod 96 which is the same as push rod 84. The only structural difference between the outboard channel member 91 and the inboard channel member 66 is, as previously indicated, that the outboard channel member 91 is closed on the extreme end by the abutment 40.

Figure 11:
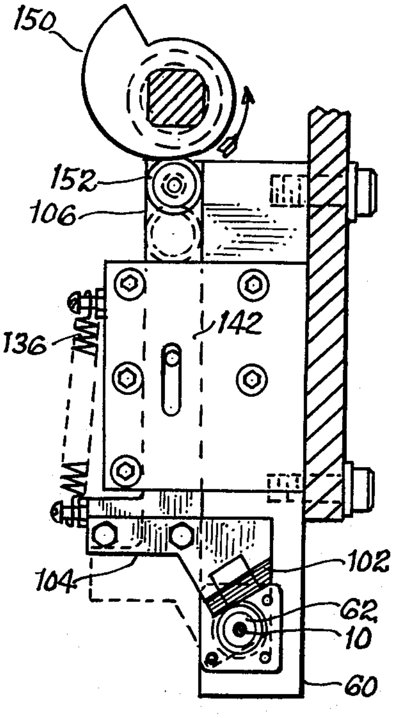
FIG. 11 is a sectional view taken along the lines 11—11 in FIG. 8.

As shown in FIG. 8 of the drawing, a space 100 is provided between the guide member 60 and the inboard channel member 66. Mounted in the space 100 is a cutting blade 102. As can be seen in FIG. 11 of the drawing, the cutting blade 102 is mounted by means of a flange 104 on a vertically reciprocating push rod 106. As will be apparent to those skilled in the art, when the push rod 106 is pressed downwardly as shown in FIG. 11, the cutting blade 102 serves to cut the wire 10 while the wire 10 is secured in the central opening 62 of the guide member 60 and in the closed central opening 68 of the inboard channel member 66.

As is also shown in FIG. 8 of the drawing, there is provided a pair of gaps 108 and 110 between the inboard channel member 66 and the central channel member, and the central channel member and the outboard channel member 91, respectively. As indicated previously, the apparatus of the present invention includes a conveyor system formed of a pair of spaced parallel rails 32 on which there are mounted a pair of laterally spaced conveyor chains 34. The conveyor chains 34 which carry opposed pairs of grippers or keepers 36, and the assembly of the parallel rails 32 with the chains 34 and the keepers 36 mounted thereon are positioned within the gaps 108 and 110.

Figure 9:
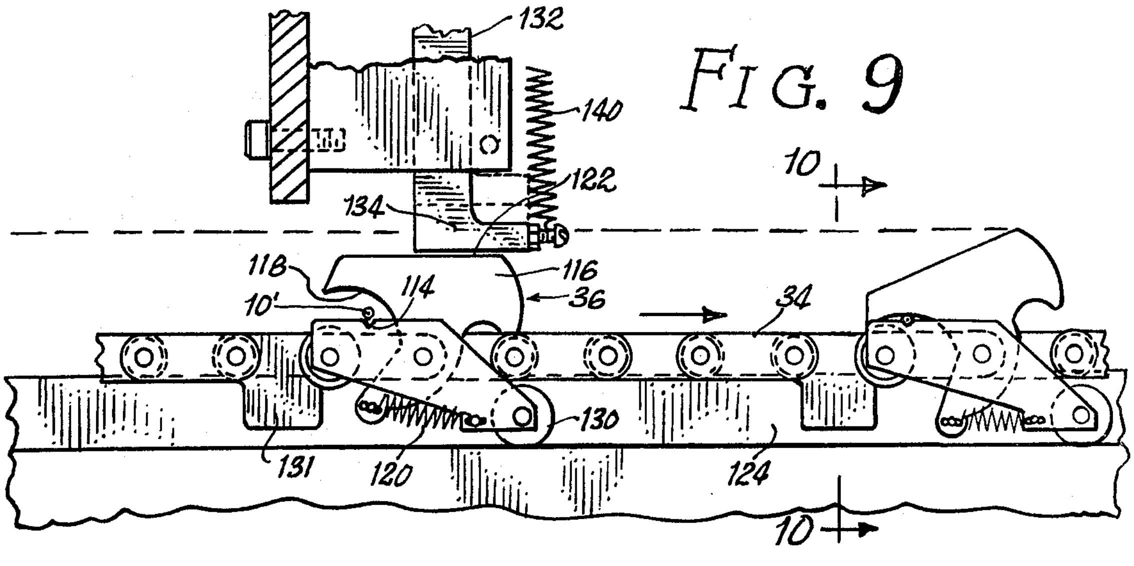
FIG. 9 is a sectional view taken along the lines 9—9 in FIG. 8.

A detailed view of the endless chain 34 with the grippers 36 mounted thereon is illustrated in FIG. 9. As can be seen from this figure, the keeper or gripper 36 comprises a body mounted on the chain 34 with the body having a notched portion 114 adapted to receive the cross section of the wire 10. Each gripper also includes a gripping lever generally indicated as 116 in FIG. 9 which is pivotally mounted on the gripper body 112 and has an arcuate gripping surface 118 adapted to engage the wire 10 in the slot 114. For this purpose, the gripping lever is pivotally mounted on the gripper body with the arcuate surface 118 of the gripping lever being constantly urged against the wire 10 engaged in the slot 114 by means of a spring 120. While the gripping lever is normally biased toward the wire gripping position by means of the spring 120, the gripping lever can be moved to the wire release position by depressing the gripping lever 116 opposite the arcuate surface 118 as by depressing a cam surface 122 of the gripping lever 116.

As will be more fully described hereinafter, the conveyor chains 34 having the grippers 36 mounted thereon as shown in FIG. 8 of the drawing, or the rail elements 32 upon which the endless conveyor chains 34 are mounted, respectively, include rail 124 and supporting block 126, with the chain 34 being carried on the rail 124. The supporting block 126 is positioned beneath the cam head assembly and need not extend over the entire length of the rail 124. The supporting block 126 serves to prevent the gripper 36 from being pushed out of plane as the trip member 134, more fully described hereinafter, exerts a downward thrust on the gripper 36 to open the gripper to receive the lead. To maintain the chain 34 on the raised rail 124, the chain 34 is provided, at various positions over the length thereof, with a pair of spaced opposing tabs 132 which engage opposite sides of the raised rail 124 upon which the chain is carried. Thus, the tabs 132, which engage the raised rail 124, serve to insure that the conveyor system does not slip off the track.

As will be described in greater detail hereinafter, the chains 34 having the keepers 36 fixed thereon are advanced over the rails 32 by an indexing drive such that the conveyor chains 34 and the keepers 36 move in a stepwise or incremental fashion. At any time during which the conveyor chains 34 are at rest, a pair of keepers 36 is in alignment with the channel 38 such that the notch 114 of the keeper body 112 is capable of receiving the wire 10 as it is advanced through the guide member 60 and through the inboard channel member 66. For this purpose, the cam head assembly 28 as shown in FIG. 8 includes a push rod 132 which is positioned directly above the gaps 108 and 110. As is perhaps more clearly shown in FIG. 9, the push rod 132 includes a foot portion or trip member 134 which, when the push rod 132 is depressed downwardly, serves to depress the cam surface 122 of the gripper 36 and thereby maintain the arcuate surface 118 in a non-gripping position as illustrated in FIG. 9. In this way, as wire 10 is advanced through guide member 60 and inboard channel member 66 during actuation of the wire drive, the push rods 132 can be placed in the downward position as shown in FIG. 9 to thereby maintain the keepers 36 in a non-gripping position so that the wire may continuously be fed through the channel or trough 38 until the wire engages the abutment 40 at the closed end of the outboard channel member 91.

As is indicated by the foregoing, the knife 102 as well as the respective doors of the inboard, central and outboard channel members are actuated by push rods. For example, knife 102 is actuated by push rod 106, the inboard channel member door 70 is actuated by push rod 85, the central channel member vertical door 86 is actuated by push rod 90, the outboard chanel member door 92 is actuated by push rod 96 and the keeper release foot portions 134 are actuated by push rods 132. In each case, the push rods are maintained in an upward or raised position by means of various springs. For example, as shown in FIGS. 8 and 11, the knife blade is maintained in the raised position by means of spring 136; the vertical door 86 on the central channel member is maintained in a raised position by a spring 138 as shown in FIG. 12, and the keeper release members 134 are maintained in a raised position by spring 140. Similarly, each of the foregoing push rods includes a box-life guide to insure vertical reciprocating movement of the various push rods. For example, push rod 106 of the knife 102 is guided by a box generally designated as 142 in FIG. 11. The push rods for the doors of the inboard, central and outboard channel members, as well as the keeper release member 134, are guided as shown in FIGS. 9, 12, 13 and 14.

As is perhaps most clearly shown in FIG. 8 of the drawing, the cam shaft 48 is provided with a series of cams. For example, the cam shaft 48 includes a cam 150 which is positioned in continuous engagement with a cam roller 152 mounted near the upper portion of the push rod 106 of the knife 102. As can be seen in FIG. 11, as the cam shaft 48 is rotated in a counterclockwise direction, the cam 158 depresses the roller 152 to thereby lower or depress the push rod 106 and consequently cause the knife 102 to cut the wire 10.

The cam shaft also includes a pair of cams 154 and 156 which are in continuous contact with cam rollers 158 and 160, respectively, which in turn are mounted on push rods 84 and 96, respectively, to control the opening and closing of the inboard and outboard channel member doors, respectively.

In a like manner, the cam shaft also carries a pair of cams 160 which are in continuous contact with cam roller 162 fixed to the push rod 132 which actuates the keeper release member 134.

The cam shaft 48 further includes a cam 164 as shown in FIGS. 8 and 12, which is in continuous contact with a cam roller 166 mounted on the push rod 90 to control the action of the vertical central channel member door 86. Thus, as the cam 164 is rotated in a counterclockwise direction as shown in FIG. 12, the cam 164 operates to depress the roller 166 and consequently the push rod 90 to thereby close the vertical door 86 of the central channel member. In FIG. 8, the cams are illustrated in the starting position and cam 150 associated with the knife 102 is out of phase with cams 154, 156, 160 and 164 by 180°. Thus, while the push rod 106 which controls the cut-off blade is retracted, the push rods 84, 90, 96 and 132 are depressed.

In the preferred practice of this invention, each of the push rods 84, 90, 96 and 132, i.e., all of the push rods except the push rod 106 which controls the cutter, are provided with means to maintain the push rods in the depressed position against the action of the springs 138 and 140. Any suitable means may be used for this purpose. One such means is illustrated in FIG. 14 of the application as used in conjunction with push rod 90 which controls the vertical door of the central channel member 72, it being understood that the same means can be employed to maintain the other push rods 84, 96 and 132 in the depressed or downward position.

Figure 14:
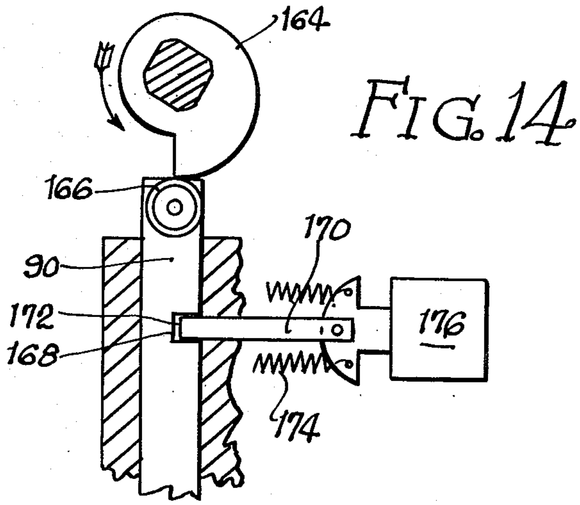
FIG. 14 is a sectional view taken along the lines 14—14 in FIG. 8.

As is shown in FIG. 14, the push rod 90 is provided with a notch 168 in the side thereof. There is also provided a sear bar 170 having an engaging member 172 adapted to engage the notch 168 in the push rod 90. The sear bar 170 is biased in the engaged position as shown in FIG. 14 by means of a spring 174. Thus, when the push rod 90 is depressed to the full down position by the action of cam 164 against the cam roller 166 fixed to the upper portion of the push rod 90, the spring 174 serves to continuously urge the sear bar 170 into a locking engagement with the notch 168 of the push rod 90. When it is desired to disengage the sear bar 170 from locking engagement with the push rod 90, a solenoid 176 may be provided to retract the sear bar 170 from its engaged position with the push rod 90 against the action of the spring 174.

As is also shown in FIG. 14, use can be made of a pair of springs on opposite sides of the sear bar 170, whereby the springs operate to continuously urge the sear bar 170 into an engaged position, and the solenoid 176 operates to disengage the sear bar 170. As those skilled in the art will appreciate, numerous other mechanisms may be used for the same purpose.

Returning to FIG. 1 of the drawing, it will be seen that the apparatus of this invention includes other work stations positioned along the conveyor chain 34. Lengths of wire, which have been processed in the cam head assembly, are advanced along the entire chain 34 while secured in the keepers 36. The conveyor is indexed in incremental lengths along the apparatus to bring the gripper 36 into registration with each station mounted downstream of the cam head assembly on the frame 30 of the apparatus.

On the next index of the conveyor chain 34, the lead is next moved into registration with a pair of stations 186 and 188 positioned on opposite sides of the conveyor chain 34. Stations 186 and 188 can be, as desired, stripping stations at which a small predetermined length of insulation is removed from both ends of the wire to expose the conductor. While the embodiment illustrated in FIG. 1 includes a stripping station on both sides of the conveyor chain 34 to strip both ends of the lead advanced to this station, it will be understood that, in some instances, it may be desirable to strip only one end of the lead wire and, consequently, one of the stations 186 and 188 can be omitted from the apparatus or simply turned off.

The wire from the stripping station is then, on the next indexing of the conveyor, advanced to a station 190 or 192, which stations are similarly positioned on opposite sides of the conveyor chain 34. Stations 190 and 192 may be employed to apply a predetermined terminal onto one or both stripped ends of the lead. As will be appreciated by those skilled in the art, if only one end of the lead has been stripped, then only one terminal application station need be employed.

The application of the terminal can be, as desired, made in accordance with conventional practice in which a supply of terminals from reels is clipped from the reel and placed on the lead for crimping about the wire to engage both the insulation of the lead near the stripped end and the stripped wire.

Depending upon the type of leads to be produced, various other stations may be positioned beyond the stations 190 and 192. It is sometimes desirable to provide work stations which relate to a new work cycle to avoid having to changeover the apparatus when different types of leads are to be produced. In this way, one of the preceding work stations can be deactivated and a subsequent station activated to thereby change or alter the operation of the apparatus without having to shut down the apparatus for set-up time.

In the preferred practice of this inention, it is frequently desirable to provide near the discharge end of the apparatus a straightening station to remove the bend or loop in the wire caused when the wire lead is bloomed downwardly from the central channel member 72. Such a straightening station is shown generally in FIG. 1, at which the grippers 36 engaging the wire are released while roller means 196 and 198 rotating on axes perpendicular to the length of the lead wire engage the opposite ends of the lead outwardly from the grippers and move such ends outwardly to remove the loop. When the lead has been straightened by such rollers, the roller means can be disengaged from the lead and the grippers again engage the lead wire.

When the conveyor chain is again indexed, the chain carries the grippers around the end of the frame shown generally as 200 in FIG. 1 for idle return travel of the grippers on the endless chains 34. The grippers or keepers 36 can be actuated by cam elements to release the lead gripped or engaed therein and thus permit the lead to be removed from the grippers for discharge to a trough generally designated as 202.

It is possible and sometimes desirable to employ a counter mechanism which is actuated by leads at the discharge end of the apparatus to determine the number of leads supplied to the trough 202. In this way, the wires discharged from the discharge end of the apparatus can be collected in groups or batches of a predetermined number.

It will have become apparent from the foregoing that the apparatus of this invention can be set up to produce leads of any desired type and can automatically collect the leads in the form of bundles of a predetermined number. The control system can be programmed to cause the apparatus to automatically continue to produce leads of the same type until a predetermined total number has been reached whereupon the machine can be automatically shut down.

Figure 7:
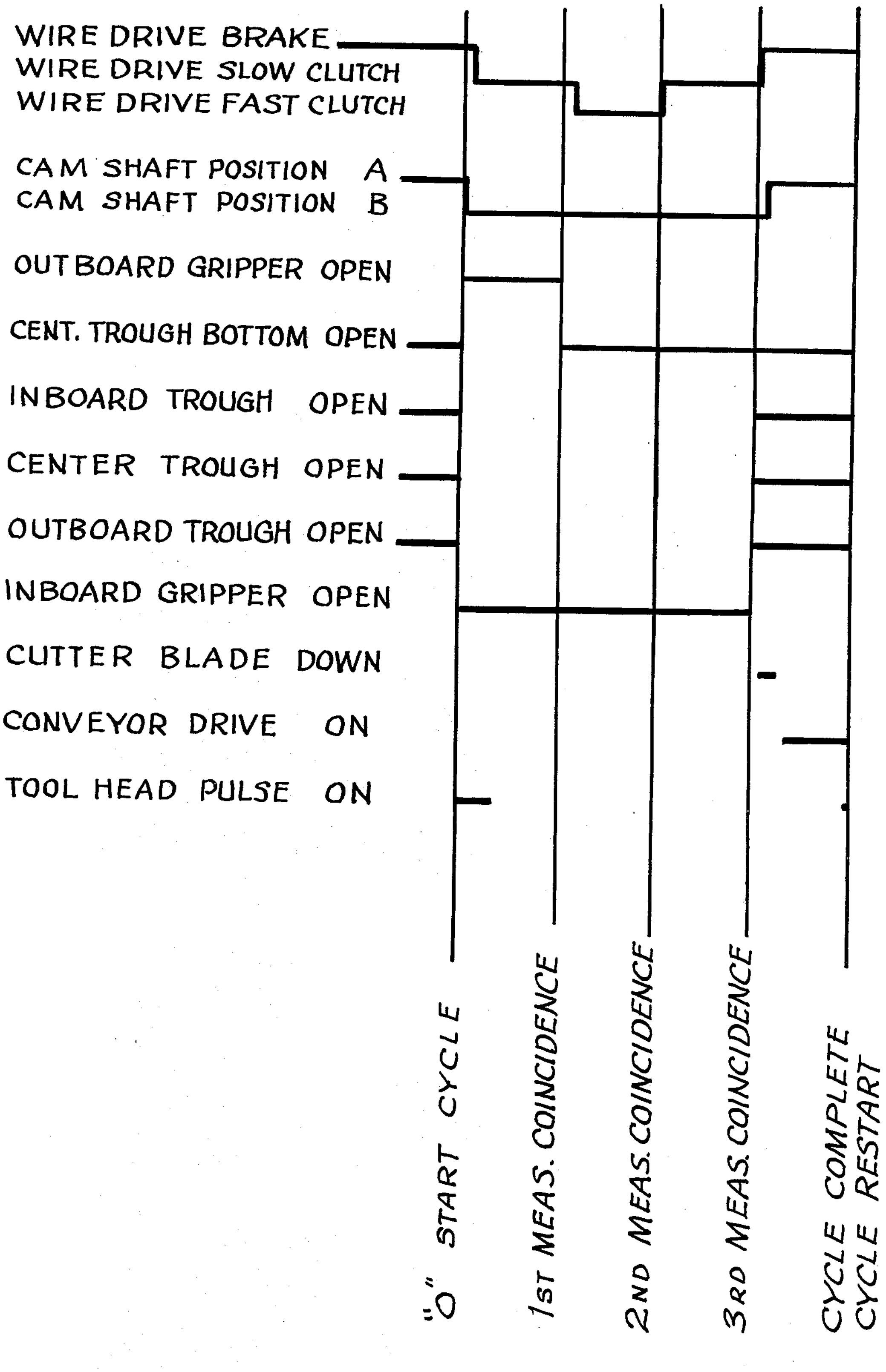
FIG. 7 is a timing chart showing the periods during which the stations of the apparatus of the invention are operating relative to each other.

Having described the apparatus, there is set forth the following as a representative description of the operation of the apparatus of this invention to produce lead wires. To aid in the understanding of the operation of the apparatus of this invention, reference is now made to FIG. 7 of the drawing which, as previously indicated, is a timing diagram. In FIG. 7, the starting of the machine is indicated by the vertical line marked "0" and which corresponds to the time when the selector switch of the apparatus is turned to the automatic position. The turning of the selector switch causes the cam to index 180° to the starting position, at which time the push rods 84, 90, 96 and 132 are all forced down and locked by the sear bar associated with each push rod. This operation causes the doors of the inboard, outboard and central channel members to close and to cause the gripper opening members 134 to depress the keeper 36 positioned on the conveyor chain 34 in alignment with the trough or channel 38. The turning of the selector switch also supplies an actuating pulse to the stripping stations 186 and 188 and the terminal application stations 190 and 192; the turning of the selector switch also actuates the straightening station 194 to cause the roller means 196 and 198 to move to a wire moving position.

With the doors for the inboard, outboard and central channel members being closed, the continuous closed passageway 38 is provided so that wire supplied through the guide member 60 may be advanced through the inboard channel member 66, the keeper 36 in the open position in the gap 108, the central channel member 72, the open keeper 36 positioned in the gap 110 and the outboard channel member 91. With the trough 38 formed by closing of the foregoing doors, the control panel 22 operates to actuate the clutch 18 whereby the wire feed roller 12 is driven by the motor 16 to advance the wire 10 between the feed rollers 12 and 14. As the roller 14 is advanced by the wire passed between the rollers 14 and 12, measuring of the length of wire advanced between rollers 12 and 14 commences to actuate the pulse generator 24 and in turn the counter 26. When the counter 26 reaches a predetermined count such that the end of the wire 10 is about to strike the abutment 40 of the outboard channel member 91, the solenoid 176, which operates the sear bar maintaining the outboard keeper member 134 in the open position, is actuated whereby the outboard keeper member 134 is released and is raised upwardly by the action of the spring 140. The result is that the arcuate surface 118 of the outboard keeper 36 closes against the wire 10. Simultaneously, the solenoid 85, which operates the bottom door 84 of the central channel member, is activated to thereby open the bottom door 84. At this point, the outboard end of the wire 10 is secured by the outboard keeper 36 and the bottom door 84 of the central channel member 72 is in the open position; the wire 10, still being advanced by the drive roller 12, passes through the opening at the bottom of the central channel member and blooms downwardly between te inboard and outboard conveyor chains 34 as shown in FIGS. 8 and 10 of the drawing.

If desired, the apparatus of the invention may embody an optional control arrangement to cause the wire drive to shift to a high speed when the outboard gripper is closed on the lead wire. As a result, the wire can be fed to the machine at high speeds to thereby maximize the efficiency of the apparatus. For this purpose, use can be made of a high speed clutch which is operatively connected with the control means. Even when the wire is advanced into the apparatus at high speed, the control means will shift the wire drive back to the slow speed clutch as shown in FIG. 7 of the drawing.

When the counter 26 reaches the predetermined number, indicating that the desired length of wire has been fed into the trough 38, the control console 22 operates to deactivate the clutch 18 and thereby stop the drive roller 12. Once the wire feed has been stopped, the solenoids 176 associated with the push rods 84, 90 and 96 as well as the push rod 132 associated with the inboard keeper number 134 are actuated to permit each of the push rods to be raised due to the action of the spring associated with each. The result of the release of each of these push rods is to open the doors 70 and 92 of the inboard and outboard channel members, respectively, and to open the vertical door 86 of the central channel member 72. In addition, the inboard keeper release member 134 is raised to cause the inboard keeper 36 to close on the wire 10.

At this time, the cam shaft is rotated another 180° by actuation of the clutch 58; the rotation of the cam shaft a second 180° operates to depress the push rod 186 controlling the cutter 102 and consequently, the wire 10 between the guide member 60 and the inboard channel member 66 is severed. After the wire is severed or cut and all of the push rods are in the up position, the conveyor is actuated to index an incremental length. At the time the conveyor is indexed, the doors of both the inboard and outboard channel members as well as the door of the central channel member are open and the lead is gripped between the inboard and outboard keepers 36. Thus, the indexing of the conveyor serves to advance the wire from the open trough while engaged in the keepers 36 to the next work station 180.

After the indexing movement has been completed, a pulse is sent from the control panel to each of the work stations to actuate each of them to carry out their respective operations. Thus, as a lead wire is advanced to each station, as the cycle is repeated, that same wire is stripped in the next station, and as the cycle is repeated again, a terminal is applied to that same wire.

The lead in the straightening station 194, upon receiving a pulse after completion of the indexing step, is released from its grippers and will be seized by the straightening rollers 196 and 198 until pulled taut. As will be appreciated by those skilled in the art, a limit switch may be employed to detect when the lead has been pulled taut to retract the rollers 196 and 198 from the lead and again permit the grippers at the straightening station to again engage the lead for discharge.

As will be appreciated by those skilled in the art, as the cycle is repeated, one additional length of wire is advanced into the cam head assembly and is subjected to operations previously described. As a result, each time the conveyor is indexed, a lead is pulled from the cam head assembly for advancement along the chain conveyor 34 to the subsequent work stations.

As the conveyor chains continue to index with each cycle, the lead wires are carried to the discharge end of the conveyor where they are released from their keepers and discharged. It will, thus, be understood by those skilled in the art that the present application provides a significant improvement in apparatus for processing continous filament material to form predetermined lengths thereof.

It will be understood that various changes and modifications can be made in the details of construction, procedure and use without departing from the spirit of the invention, especially as defined in the following claims.

I claim:

1. Apparatus for processing continuous filament material to form predetermined lengths comprising head means defining a channel adapted to receive a continuous length of the material, said channel including a central portion having an arcuate configuration whereby predetermined lengths bow outwardly therefrom, said head means including cutting means positioned to cut the continuous length to the predetermined length, feeding means to intermittently supply the continuous length directly to the channel, elongate spaced, parallel conveyor means positioned to receive predetermined lengths from the channel with the predetermined lengths bowed therebetween, said conveyor means including gripping means to carry the predetermined lengths, said head means also including discharge means to supply the predetermined length from the channel to the gripping means, work stations along the conveyor means positioned to receive the predetermined length on sucessive indexing of the conveyor means, said work stations adapted to operate the end of the predetermined length and means to discharge the predetermined lengths from the gripping means.

2. Apparatus as defined in claim 1 wherein the feeding means includes a pair of rollers adapted to engage the continuous length therebetween, and drive means to advance the continuous length into the channel.

3. Apparatus as defined in claim 2 which includes control means to measure the length of material advanced between the pair of rollers, the control means including means to stop the drive means and to actuate the cutting means when the predetermined length is advanced between the rollers.

4. Apparatus as defined in claim 3 wherein one of the rollers is dimensioned to have a circumference equal to a unit of length, and the control means includes means to convert each increment of length into an electrical pulse to stop the drive means and to actuate the cutting means.

5. Apparatus as defined in claim 3 wherein the control means includes means to index the conveyor after the predetermined length has been supplied to the gripping means.

6. Apparatus as defined in claim 1 wherein the continuous material is insulated wire.

7. Apparatus as defined in claim 6 wherein at least one of the work stations is adapted to strip insulation from one of the wire and at least one of the work stations is adapted to apply an electrical terminal to one end of the wire.

8. Apparatus as defined in claim 1 wherein the elongate conveyor means is formed of a pair of endless chains, with the gripping means mounted on the chains to permit the ends of the predetermined length to extend outwardly from the chains.

9. Apparatus as defind in claim 1 wherein the gripping means include a body mounted on the conveyor means having a notch therein adapted to receive the cross section of the predetermined length, and a gripping lever having an arcuate gripping surface, said lever being mounted on the body and being constantly urged toward a gripping position.

10. Apparatus as defined in claim 1 wherein the head means includes an inboard channel member defining a portion of the channel, a central channel member defining a portion of the channel and an outboard channel member defining a portion of the channel, said outboard channel member being closed at the outboard end, each of said channel members including means to open the portion of the channel defined by each channel member whereby actuation of the discharge means operates to open the channel members to permit removal of the predetermined length therefrom.

11. Apparatus as defind in claim 1 wherein the gripping means are aligned with the channel member to receive the predetermined length therefrom, and the discharge means includes trip means to maintain the gripping means in an open position to receive the continuous length and to release the gripping means after the continuous length has been cut to form the predetermined length to gripping position before the conveyor means is indexed.

12. Apparatus as defined in claim 11 which includes cam means operatively connected to the trip means to maintain the gripping means in the open position and to release the gripping means.

13. Apparatus as defined in claim 12 wherein each of the inboard and outboard channel members includes slidable door means to open the inboard and outboard channel members, said door means being operatively connected to the cam means whereby the cam means opens and closes the door means.

14. Apparatus as defined in claim 12 wherein the central channel member includes vertical door means to open the front of the central channel member, with the cam member being operatively connected to the vertical door means to open and close the front of the central channel member 15. Apparatus as defined in claim 12 wherein the central channel member has an arcuate configuration and includes horizontal door means and means to open the horizontal door means as the continuous length is advanced through the channel to permit the continuous length to bow outwardly through the horizontal door means.

* * * * *